United States Patent [19]

Ridenour

[11] Patent Number: 5,313,839
[45] Date of Patent: May 24, 1994

[54] TRANSDUCER ASSEMBLY AND METHOD

[76] Inventor: Ralph G. Ridenour, 626 Lexington-Ontario Rd., Mansfield, Ohio 44903

[21] Appl. No.: 938,887

[22] Filed: Aug. 31, 1992

[51] Int. Cl.⁵ .............................................. G01L 9/00
[52] U.S. Cl. ................................. 73/756; 73/753; 73/706
[58] Field of Search .................. 73/756, 706, 717-720, 73/721-728, 733-735, 745-746, 753-754, 431; 29/621.1; 338/4, 42

[56] References Cited

U.S. PATENT DOCUMENTS

| | | |
|---|---|---|
| 1,569,178 | 1/1926 | Foster .................... 73/756 |
| 1,867,779 | 7/1932 | Thompson . |
| 3,247,719 | 4/1966 | Chelner . |
| 4,333,491 | 6/1982 | Knubley . |
| 5,063,784 | 11/1991 | Ridenour . |

FOREIGN PATENT DOCUMENTS 542744  8/1930  Fed. Rep. of Germany .
347172  4/1931  United Kingdom .

Primary Examiner—Richard E. Chilcot, Jr.
Assistant Examiner—Joseph L. Felber
Attorney, Agent, or Firm—Pearne, Gordon, McCoy & Granger

[57] ABSTRACT

A transducer assembly includes a cap readily removable from a housing and enclosing a pressure transducer and a main valve body. Seals are located inside the housing which often are elastomeric or otherwise heat damageable. A top cartridge together with all of the seals inside the housing is readily disconnectable from the housing to separate the seals from the transducer assembly first end. This first end may then be heat sealed by soldering, brazing, or welding to a manifold or the like without any heat damage to the various seals. The transducer assembly then may be readily reassembled to form an operative transducer assembly. The foregoing Abstract is merely a resume of general applications, is not a complete discussion of all principles of operation or applications, and is not to be construed as a limitation on the scope of the claimed subject matter.

14 Claims, 1 Drawing Sheet

TRANSDUCER ASSEMBLY AND METHOD

BACKGROUND OF THE INVENTION

The U.S. Pat. No. 5,063,784 discloses a transducer assembly wherein the assembly may be easily serviced. The initial unthreading of a cartridge in the housing closes a first valve so that refrigeration fluid will not leak out of the assembly.

Other prior art using a transducer assembly to be assembled in the field to a manifold or the like first assembled a manual shut off valve to the manifold and then screwing the transducer assembly into the manual shut off valve. This was undesirable because it merely added another part to leak, especially the leakage along the valve stem of refrigerant fluid which was a danger to the ozone layer in the atmosphere. Additionally, the operator might not open the hand valve fully once the combination was assembled and this could adversely affect the pressure applied to the pressure transducer.

The prior art also utilized a pressure transducer such as a strain gage in the transducer assembly and then this change of resistance was fed out through a shielded cable to a external conditioning circuit. The cable had to be shielded because this was a high impedance circuit between the strain gage and the external conditioning circuit which was extremely sensitive and could pick up static or electromagnetic radiation.

SUMMARY OF THE INVENTION

The present invention relates to a transducer assembly which may be field assembled by heat sealing such as silver soldering, brazing, or welding into a manifold or the like of a refrigeration system. This may be for air conditioning, refrigeration or freezing, as desired. Most transducer assemblies include elastomeric sealing means such as O-rings or valve washers which can be damaged by the heat of the heat sealing. Accordingly the present invention is directed to a means to permit heat sealing of a transducer assembly without damage to any of the sealing means.

The invention relates to a transducer assembly for assembly with a manifold or the like by heat sealing such as brazing or welding with cartridge means in a transducer housing having a heat sealable first end with a bore therethrough. The cartridge means includes a main valve body and a pressure-to-electrical-signal transducer and each with a sealing means to seal with the transducer housing, a cap having a readily disconnectable connection means with a second end of the transducer assembly, the bore communicating with said transducer through the main valve body for applying pressure to the transducer, the sealing means being readily removable from the transducer assembly whereby the transducer assembly first end may be heat sealed to a manifold or the like without heat damage to any of the internal components of the transducer assembly.

The invention also includes the method of assembly of a transducer assembly first end with a manifold or the like by heat sealing, the transducer assembly including cartridge means in a transducer housing, the cartridge means including a main valve body and a pressure-to-electrical-signal transducer and each with sealing means to seal with the transducer housing, a cap having a readily disconnectable connection means with said transducer housing, a bore communicating from said transducer assembly first end through said main valve body with said transducer for applying pressure thereto, said method comprising separating all said sealing means from said transducer assembly first end, heat sealing said transducer assembly first end to a manifold or the like, and reassembling the transducer assembly with said sealing means therein to form an operative transducer assembly.

Accordingly an object of the invention is to provide a transducer assembly which may be field assembled without heat damage to any of the heat damageable seals in the assembly.

Another object of the invention is to provide a transducer assembly which incorporates an electrical circuit board connected for processing the electrical signal from the pressure-to-electrical-signal transducer.

Another object of the invention is to provide an easily installed and removed valve cartridge.

Another object of the invention is to provide an entire transducer assembly which is easily repaired or replaced taking only in the order of 10 seconds to remove the upper section containing the electrical conditioning circuit and the pressure-to-electrical-signal transducer.

BRIEF DESCRIPTION OF THE DRAWINGS

FIG. 2 is the completed transducer assembly as mounted on a manifold or the like.

DESCRIPTION OF THE PREFERRED EMBODIMENT

Figure 2:
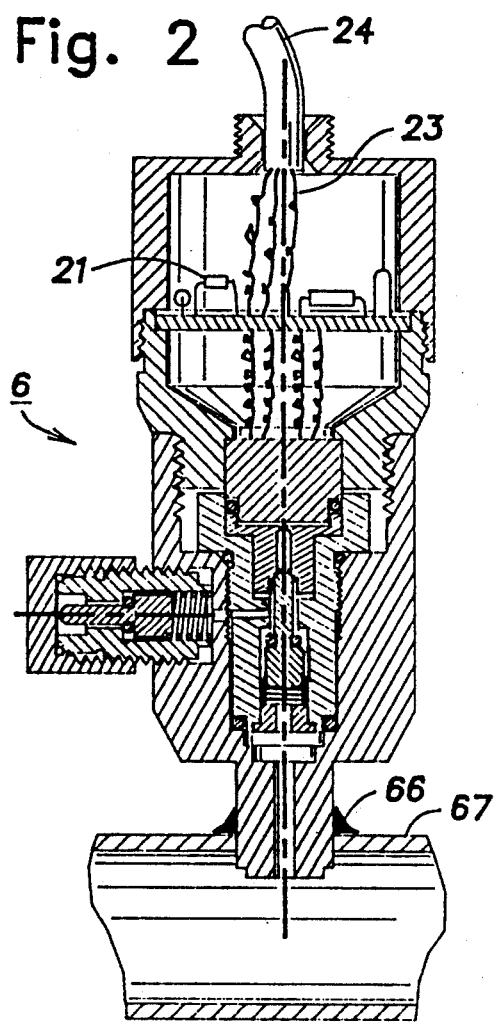
Figure 1:
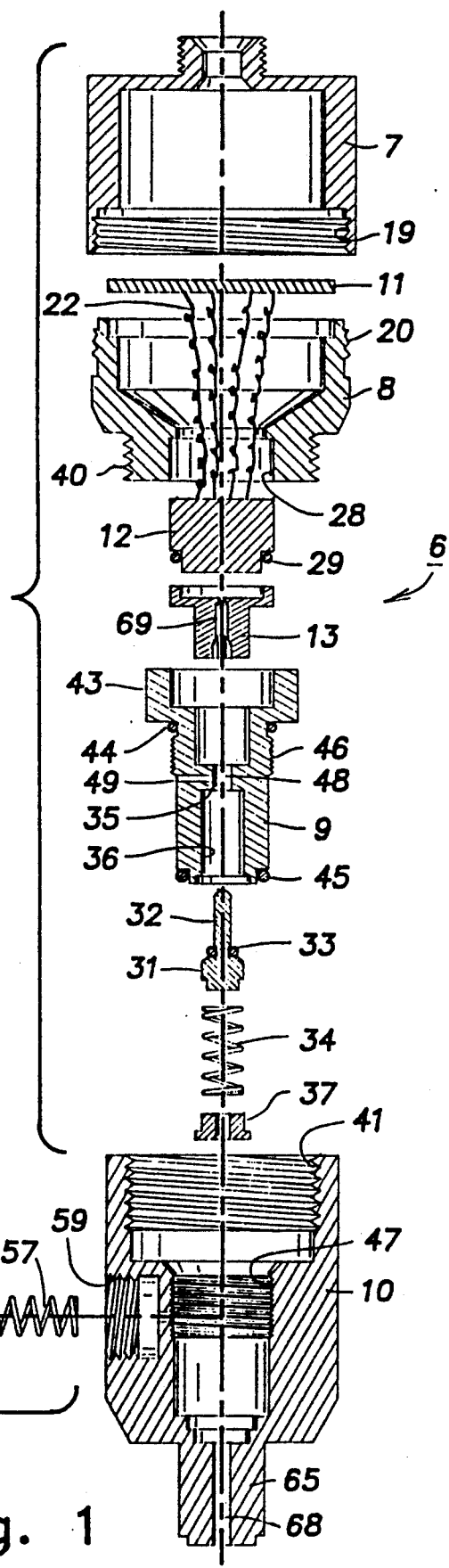
FIG. 1 is a longitudinal cross sectional exploded view of the transducer assembly.

FIGS. 1 and 2 show a transducer assembly 6 which includes generally a cap 7, a body 8, a main valve assembly 9, and a housing 10. Also included in this transducer assembly is a circuit board 11, a pressure-to-electrical-signal transducer 12, and a valve actuator 13.

More specifically the transducer assembly 6 has the cap 7 which has a readily connectable means with the body 8 in this case shown as internal threads 19 and male threads 20. The printed circuit board 11 has a number of electrical components 21 thereon not shown in FIG. 1 for clarity, but shown in FIG. 2. These process the electrical signal from the pressure-to-electrical-signal transducer 12, which may be a strain gage type of transducer. To this end four electrical conductors 22 interconnect the circuit board 11 and pressure transducer 12. The electrical components 21 on the circuit board 11 process the electrical signal so that it is a uniform signal for a wide temperature range to which the assembly 6 may be subjected. The strain gage transducer 12 may be a Wheatstone bridge structure with four arms necessitating four conductors 22 between the circuit board and the transducer 12. Conductors 23 are connected on the upper side of the circuit board and pass out into a cable 24 for external use of the conditioned signal.

The pressure transducer is most usually a Wheatstone bridge which varies only in resistance. The circuit board 11 electrically conditions this electrical signal. The circuit board provides a well regulated or constant voltage which is temperature compensated. This voltage is applied to the Wheatstone bridge so that there is a variable current depending substantially only on the variation of resistance of the bridge. If the pressure transducer is placed in the hot side of the refrigeration circuit, it may be subjected to temperatures of up to 200° F. If it is placed in the cold side of the circuit, it may be subjected to temperatures of −40° F. and thus there is a 240° F. temperature range to which the circuit board is subjected. The circuit is temperature compensated for this entire temperature range so that the only variable is the changing resistance from the transducer or strain gage. The body, cap and housing are preferably of brass and this provides complete electromagnetic shielding for the electrical circuit and for its connection to the pressure transducer. In the prior art this connection between the pressure transducer and an external circuit was a high impedance circuit which was subject to picking up static and electromagnetic radiation, which could affect the accuracy of the output signal. In this case, no shielded cable is needed since the cable 24 is in a low impedance circuit rather than high impedance and is not affected by static or electromagnetic radiation.

The pressure transducer 12 has a press fit into a recess 28 in the lower end of the body 8. An O-ring 29 is a sealing means with the valve actuator 13. The valve actuator 13 and then the pressure transducer 12 fit inside the upper end of the main valve body 9 with the valve actuator having a sliding fit. A movable valve part 31 has a valve stem 32 and an O-ring 33 as a sealing means. A compression spring 34 urges the valve part 31 upwardly into the valve body 9 so that the O-ring 33 may seat against a shoulder 35 in a recess 36. The spring 34 is held in by a plug 37 which has a press fit or interference fit in the recess 36.

The body 8 has a readily disconnectable connection means with the housing 10 and this is shown as male threads 40 on the body 8 and female threads 41 on the housing 10. The valve body 9 has a hex head 43 for ready actuation of the valve body 9 and has O-rings 44 and 45 to seal with the housing 10 by means of the threads 46 on the valve body 9 and threads 47 in the housing 10. The valve stem 32 has a sliding fit with a central orifice 48 so that a side port 49 is in fluid communication with the pressure transducer 12 and also the housing 10 if the movable valve 31 is open. The movable valve part 31 is smaller than the mating aperature 36 for slight fluid flow past it when open. The above-mentioned parts, with reference numerals 7–49 may be termed a top cartridge 50 which is readily removable and re-connectable.

A side valve body 51 has threads 53 to receive a closure cap 52 and as a readily disconnectable connection means with the housing 10 at threads 59. For ease of manufacture and assembly, a movable valve part 54 may be the same as valve part 31 with a small clearance in valve body 51 and has a valve stem 55 and carries an O-ring 56. This movable valve part 54 is urged outwardly of the housing 10 and inwardly of the side valve body 51 by a compression spring 57. The valve stem 55 extends loosely through an orifice 58 in the valve body 51 so that it is near the outer end of the valve body 14 and may be actuated inwardly by a valve depressor on a gage which can be applied to the outer end of the valve body 51. Such a gage can read the pressure at the transducer 12, and also in the refrigeration system if the main valve 31 is open. The parts with reference numeral 51–58 may be considered a side valve cartridge 60, and together with the top cartridge 50 establish cartridge means which may readily be removed from the housing 10. This housing 10 has a first end 65 which also may be considered the first end of the entire transducer assembly 6. As shown in FIG. 2, this first end is that which is heat sealed as by solder, braze, or weld material 66 to a manifold 67 or the like. This permits assembly in the factory or assembly out in the field. The manifold 67 may be one to which a number of refrigeration compressor units are connected in parallel as well as a number of refrigeration usage equipments are connected, also in parallel. Then as the load increases successively greater numbers of compressor units are energized to supply compressed refrigerant to the manifold 67.

The housing 10 has a bore 68 coaxially through the housing 10 so that the pressure in the manifold 67 may be communicated to the pressure transducer 12 via the main valve body 9. As shown in FIG. 2, when the transducer assembly 6 is completely assembled, then the valve actuator 13 pushes down on the valve stem 32 to open this movable valve part 31 and thus there is fluid communication through the bore 68, around the movable valve part 31 and around the valve stem 32, through the central orifice 48 and through a central orifice 69 in the valve actuator 13. In this actuator there is a saw slot perpendicular to the plane of the paper of FIG. 1 which is not readily discernable in the drawings so that the tip of the valve stem 32 does not close off fluid communication through the bore 68 and central orifice 69.

OPERATION

In operation, transducer assembly 6 may be heat sealed to some structure such as the manifold 67, either in the factory or out in the field. This may be quickly accomplished by applying a wrench or the like to the body 8 to unthread it at the threads 40, 41 from the housing 10. This removes the cap 7, circuit board 11, body 8, and pressure transducer 12. Next the main valve body 9 may be removed by applying a wrench to the hex head 43, to unthread this valve body. This removes the valve body 9 and moveable valve 31 as a unit. Thus the entire top cartridge 50 is readily disconnectable at the connection means 40, 41 and 46, 47. Also the side cartridge 60 is readily removable at the connection means 53, 59. This quick removal of the cartridge means 50, 60 is an exceptionally easy way to separate the sealing means from the first end 65 of the transducer assembly. These sealing means include the seals 29, 33, 44, 45, and 56. Generally such seals include O-rings or valve washers which are elastomeric or otherwise of softer material to provide a good valve seal. However, such elastomeric or soft seal material is easily heat damaged by the heat of soldering, brazing, or welding. In the prior art construction at least one of the seals was removable only through the lower end corresponding to the first end 65 in this FIG. 1. As such, after such first end was secured in a manifold 67, it would not be possible to reinsert such seal into the transducer assembly.

After the separation of the seal means from the transducer assembly first end 65, then the heat sealing to the manifold may be accomplished. Once this is done and the unit has cooled, then the seal means may be readily reassembled in the transducer assembly. To do this the cartridge means 50 and 60 are rethreaded into the housing 10 to complete the assembly and to form an operative transducer assembly.

The transducer assembly 6 still provides for quick inspection, replacement or repair of the many parts of this assembly 6. The cap 7 may be unthreaded to provide access to the circuit board 11 for testing, repair, replacement or the like. The body 8 with or without the cap 7 attached may be quickly removed from the housing 10. This provides for the ready testing, repair, or replacement of the transducer 12. As this body 8 is initially unthreaded the transducer 12 rises and this permits the spring 34 to push upwardly the valve actuator 13 until the O-ring 33 seals at the shoulder 35. This closes this main valve 9 so that there is minimum loss of refrigerant to the outside atmosphere, considering that the manifold 6 is pressurized.

The present invention has a number of advantages over the prior art. One big advantage is that when the refrigeration units are first manufactured, it is usual to test them with high pressure to make certain there are no leaks. Such high pressure may damage the strain gage or transducer 12 so with this invention it is quite easy to remove the transducer by removing the body 8 and thus the high pressure test may be performed without damage to any of the transducer components. A second main advantage is that as the body 8 is being unscrewed the internal pressure pushes the piston which is the moveable valve part 31 upwardly to shut off the valve at the O-ring 33. Therefore, the higher the pressure the better the seal at this point to eliminate freon leaks to the atmosphere. This is quite important in the current thinking of environmental protection.

The present disclosure includes that contained in the appended claims, as well as that of the forgoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A transducer assembly having a first end thereof for assembly with a manifold or the like by heat sealing comprising:
   a transducer housing having a first opening at a first end thereof;
   cartridge means in said transducer housing;
   said cartridge means including a main valve body and a pressure-to-electrical-signal transducer and each with sealing means to seal with said transducer housing;
   said main valve body insertable in said transducer housing and carrying sealing means to seal therewith;
   said pressure-to-electrical-signal transducer mountable in said transducer housing and carrying sealing means to seal therewith;
   said first opening communicating with said transducer through said main valve body for applying pressure to the transducer; and
   said sealing means being readily removable from said transducer assembly; and means to head seal said first end of said transducer assembly to a manifold or the like without heat damage to any of the internal components of the transducer assembly.

2. A transducer assembly as set forth in claim 1, wherein said cartridge means and all said sealing means are separable at a second end of said housing to permit said first end of said transducer assembly to be heat sealed to a manifold or the like.

3. A transducer assembly as set forth in claim 1, wherein all parts are removable from a second end of said housing.

4. A transducer assembly as set forth in claim 1, wherein said readily removable sealing means includes threaded connections.

5. A transducer assembly as set forth in claim 1, including an electrical circuit board enclosed inside said transducer assembly to condition the signal from said transducer for temperature compensation throughout a temperature range.

6. A transducer assembly as set forth in claim 1, including a side valve assembly in said cartridge means; and readily removable connection means between said side valve assembly and said housing.

7. A transducer assembly as set forth in claim 1, including a cap with a readily removable connection means relative to said housing.

8. A transducer assembly as set forth in claim 7, including a body between said cap and said housing and readily disconnectable with each.

9. A method of assembly of a transducer assembly first end with a manifold or the like by heat sealing, the transducer assembly including cartridge means in a transducer housing, said cartridge means including a main valve body and a pressure-to-electrical-signal transducer and each with sealing means to seal with said transducer housing, and a bore communicating from said transducer assembly first end through said main valve body with said transducer for applying pressure thereto,
   said method comprising: separating all said sealing means from said transducer assembly first end;
   heat sealing said transducer assembly first end to a manifold or the like; and
   reassembling said transducer assembly with said sealing means therein to form an operative transducer assembly.

10. The method as set forth in claim 9, wherein said transducer assembly first end is unitary with a first end of said housing.

11. The method as set forth in claim 9, wherein said sealing means are elastomeric subject to heat damage at heat sealing temperatures.

12. The method as set forth in claim 9, including a side valve body and sealing means therefor as part of said cartridge means.

13. The method as set forth in claim 9, wherein said transducer housing has first and second ends, and said method includes removing said cartridge means and sealing means from said housing first end via said housing second end.

14. The method as set forth in claim 9, wherein said step of separating said sealing means from said transducer assembly first end is accomplished by removing said cartridge means from said transducer assembly first end.

* * * * *

UNITED STATES PATENT AND TRADEMARK OFFICE
CERTIFICATE OF CORRECTION

PATENT NO. : 5,313,839

DATED : May 24, 1994

INVENTOR(S) : Ralph G. Ridenour

It is certified that error appears in the above-identified patent and that said Letters Patent is hereby corrected as shown below:

Column 1, line 24, "a" should be --an--; and

Column 5, line 56, "head" should be --heat--.

Signed and Sealed this

Twenty-third Day of August, 1994

Attest:

BRUCE LEHMAN

Attesting Officer

Commissioner of Patents and Trademarks